May 6, 1969   J. H. FOWLER   3,442,536
PIPE JOINT HAVING CIRCUMFERENTIALLY SPACED TEETH COUPLING MEANS
Original Filed Aug. 15, 1966   Sheet 1 of 5
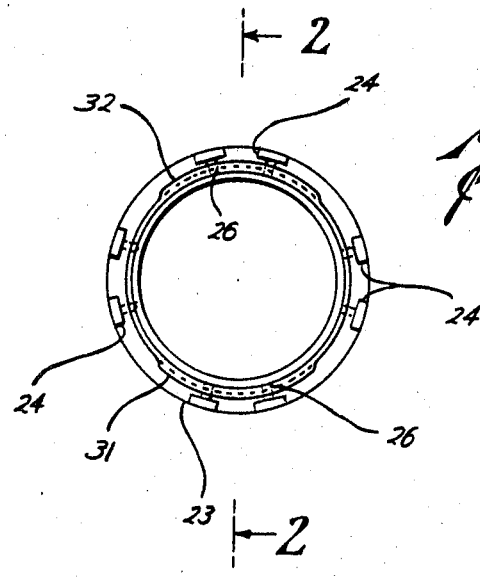
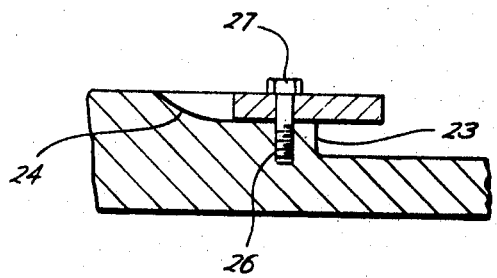
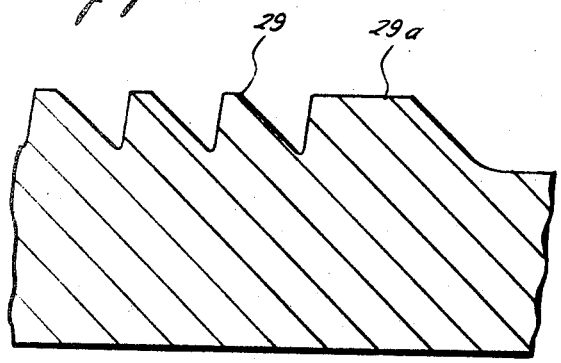
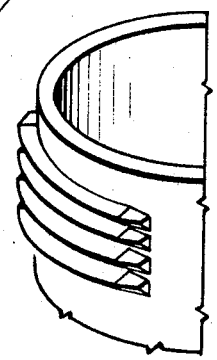
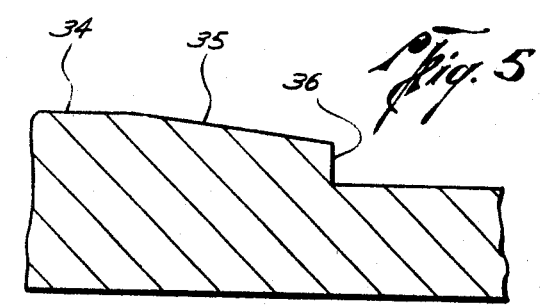
John H. Fowler
INVENTOR
BY Robert W. B. Dickerson
ATTORNEY John H. Fowler
INVENTOR BY Robert W. B. Dickerson

ATTORNEY

May 6, 1969        J. H. FOWLER        3,442,536

PIPE JOINT HAVING CIRCUMFERENTIALLY SPACED TEETH COUPLING MEANS

Original Filed Aug. 15, 1966        Sheet 4 of 5

John H. Fowler
INVENTOR

BY Robert W. B. Dickerson

ATTORNEY

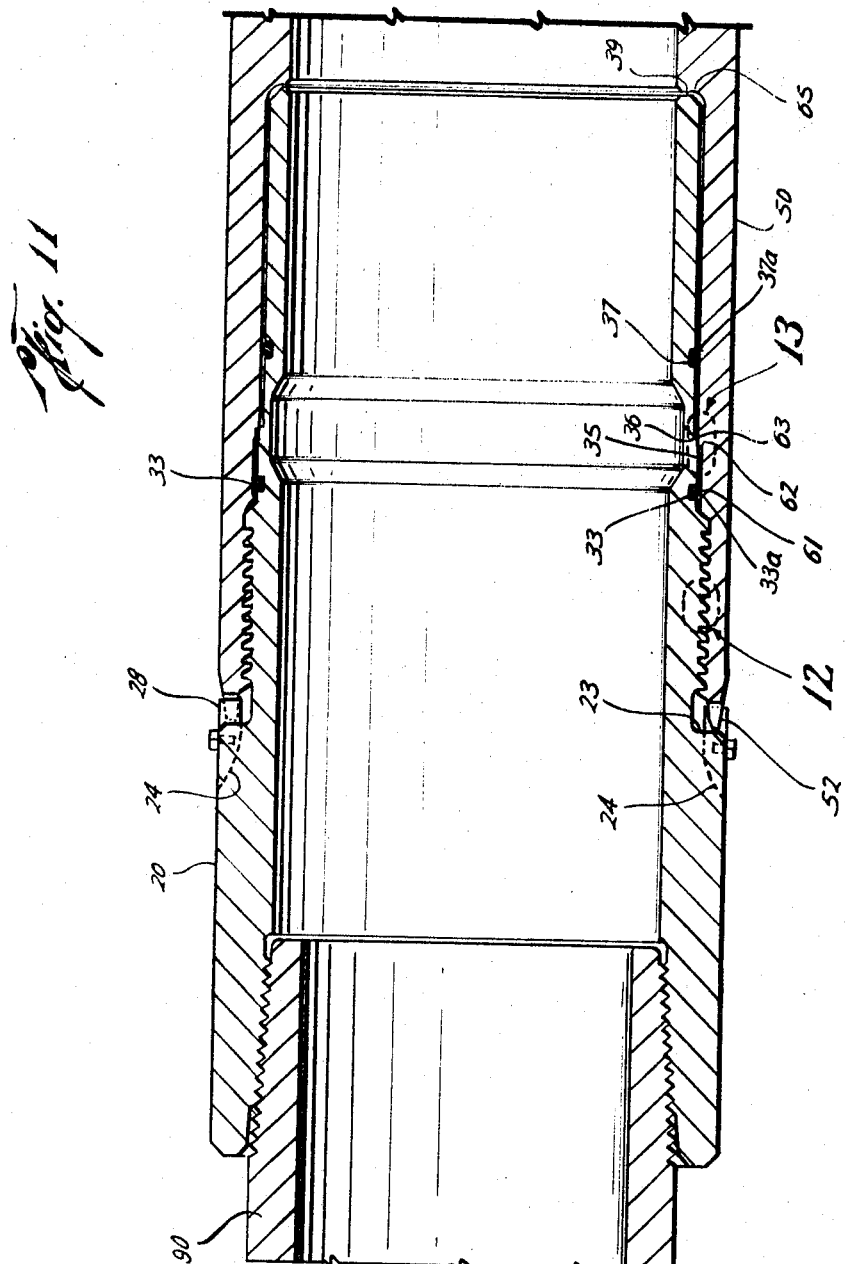

United States Patent Office 3,442,536
Patented May 6, 1969

3,442,536
PIPE JOINT HAVING CIRCUMFERENTIALLY SPACED TEETH COUPLING MEANS
John H. Fowler, Houston, Tex., assignor to Rockwell Manufacturing Company, Houston, Tex., a corporation of Pennsylvania
Continuation of application Ser. No. 572,511, Aug. 15, 1966. This application May 9, 1968, Ser. No. 728,081
Int. Cl. F16l 37/24, 15/00
U.S. Cl. 285—27          14 Claims

ABSTRACT OF THE DISCLOSURE

A joint connection comprising a male member and a female member. The male member is provided with vertical groupings of teeth on the exterior thereof. The teeth have no lead angle. Lying between each group of teeth is a smooth wall segment whose diameter is no greater than the root diameter of the toothed portion. The female member is provided on its interior with corresponding tooth groupings for mating with the male member teeth. The female member also has smooth walled segments between tooth segments, the diameter of which is no less than the root diameter of these tooth segments. The width of the smooth wall segments is greater than the width of the tooth segments to allow full insertion of the male member into the female member on alignment of the tooth segments of one member with the smooth wall segments of the other member. The male member, fully inserted, may be rotated in either direction a fraction of a turn causing full engagement of corresponding tooth segments. Positional stop keys attached to the male member are provided to contact lug extensions on the female member to limit rotation at full engagement. Seal means are provided including corresponding tapered portions on each member.

---

This application is a continuation of application Ser. No. 572,511 filed Aug. 15, 1966 and now abandoned.

This invention concerns a means for removably joining two cylinders together. More specifically it concerns a joint which permits a cylindrical device such as a casing to be removably linked to another member, which other member may be a further casing section, tubing a well head extension or the like.

When engaged in underwater exploration or production, particularly, it is obviously beneficial to be able to securely and expeditiously be able to join together two tubing sections, such as a casing string to a hanger. Numerous prior structures have been developed to permit such a linkage. Most, however, have either proved difficult to secure or have required excessive turning, or have not provided sealing engagement. The joint of the invention includes male and female members with tooth groupings separated by smooth wall segments on the exterior and interior of the male and female members respectively. Thus, with the tooth groupings of one member aligned with the smooth wall segments of the other member, the male member may be fully inserted into the female member. Then a fraction of a turn in either direction will fully engage the corresponding tooth grouping of each member. So that this connection is not accidentally disengaged, a locking taper is provided on each member acting also as a metal-to-metal seal. The locking and sealing may be further aided by bevels at the end of each tooth so that on full engagement a wedging action exerts a compressive force at the seal and tooth contact surface. The teeth, which have no lead angles, allow engagement or disengagement on fractional rotation in either direction.

Thus, this invention has as an object the provision of a joint for linking plural conduits.

A further object is causing plural joints to be sealingly engaged at a position well below the water's surface.

Another prime object is the formation of a device having plural joints, said joints capable of being joined together forming a metal-to-metal seal.

Another object is permitting plural conduits to be linked in such a manner that turning of one of the conduits in either a right or left hand direction will effect linkage.

Figure 2:
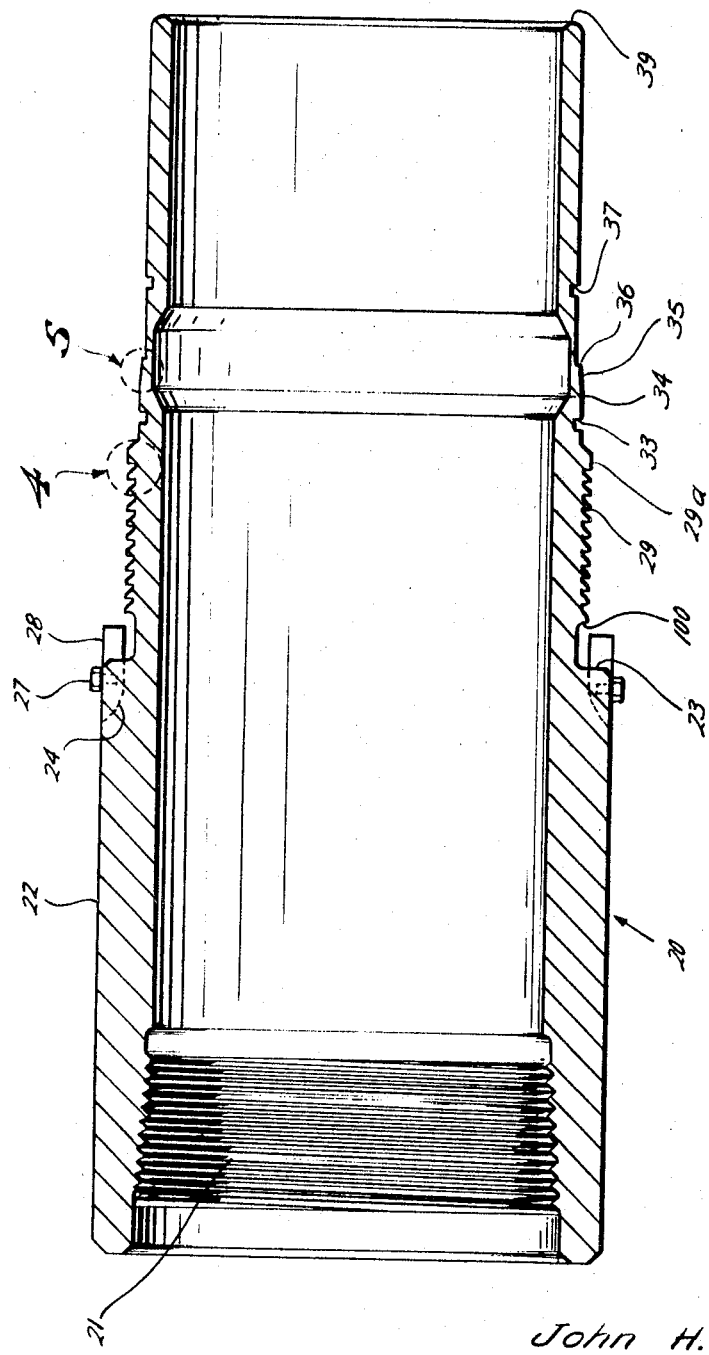
Figure 7:
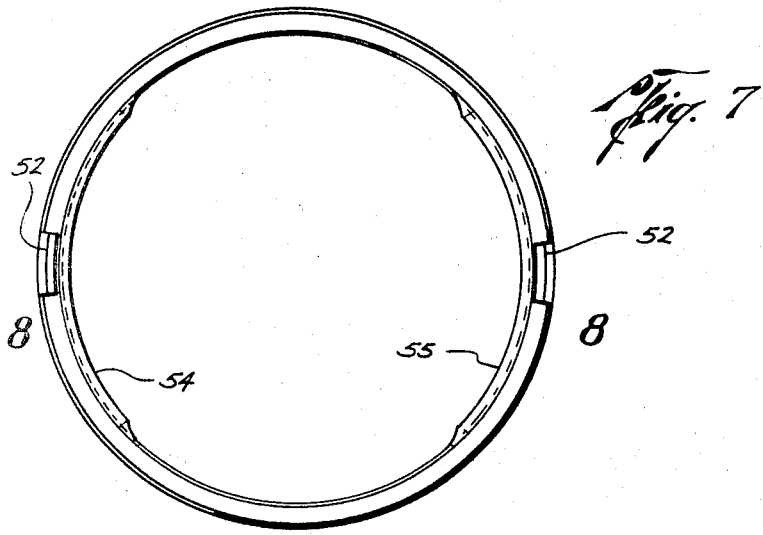
Figure 12:
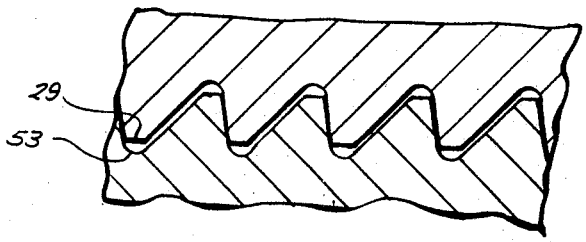
Figure 6:
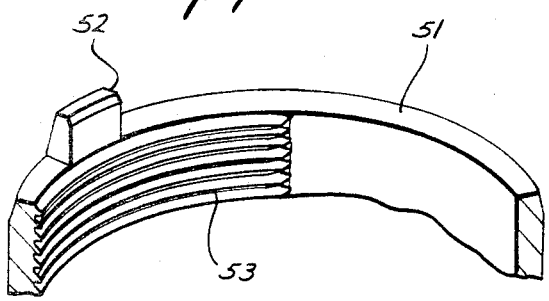
Figure 13:
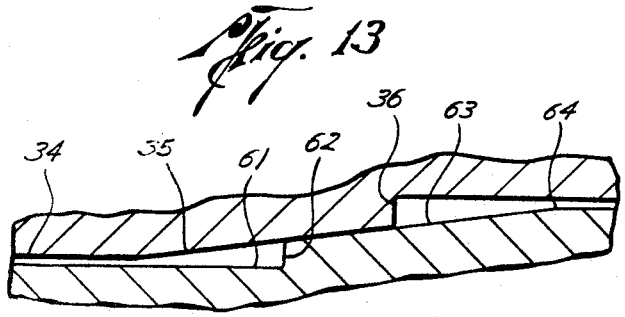
Figure 8:
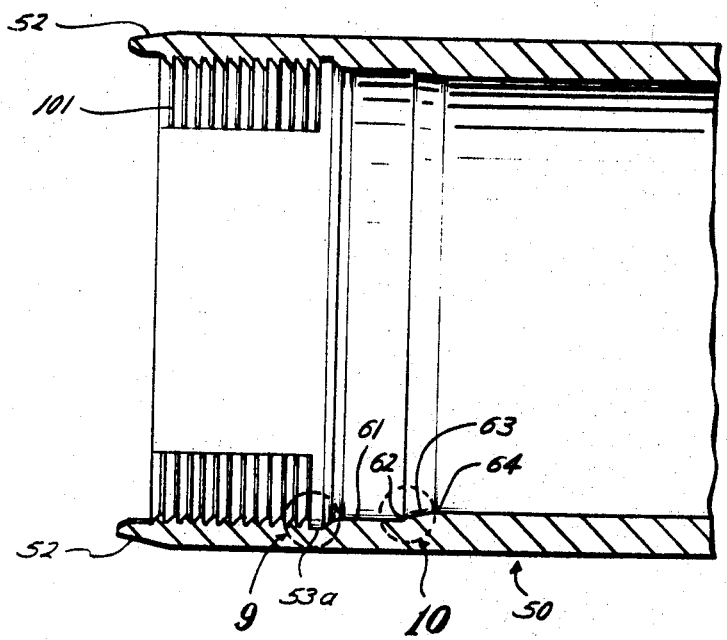
Figure 10:
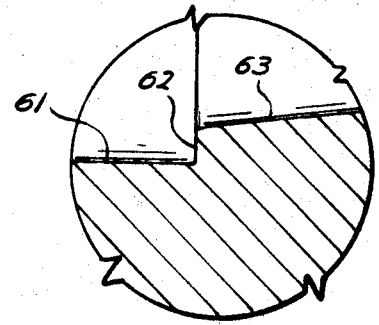
Figure 9:
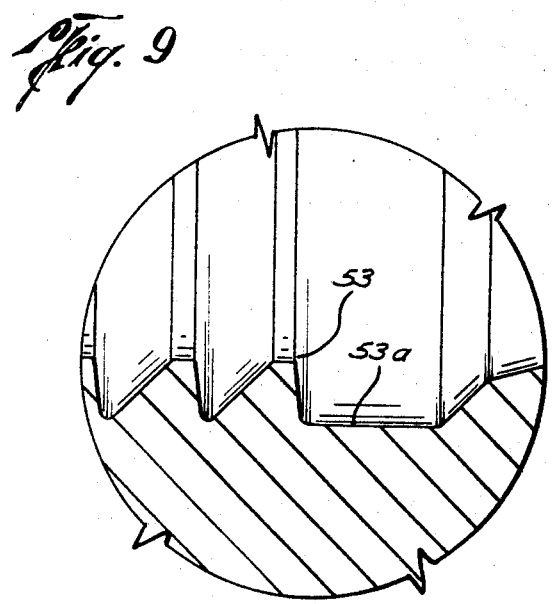

These and still further objects will become obvious on considering the following appended description and drawings, in which:

FIGURE 1 is a bottom view of the male member;
FIGURE 2 is a section taken along lines 2—2 of FIGURE 1;
FIGURE 3 is a detail of one of the stop lugs;
FIGURE 4 is a detail of the teeth on the male member;
FIGURE 5 is a detail of the locking taper portion of the male member;
FIGURE 6 is a broken perspective of the top portion of the female member of the joint;
FIGURE 7 is a top elevation of the female member of the joint;
FIGURE 8 is a section, partly broken away, taken along lines 8—8 of FIGURE 7;
FIGURE 9 is a detail of a portion of the female member's teeth;
FIGURE 10 is a detail of the locking taper portion of the female member;
FIGURE 11 is an elevation, in section, showing the male member of FIGURE 2 connected to the female member of FIGURE 8;
FIGURE 12 is a detail of the mated male and female teeth;
FIGURE 13 is a detail of the locking taper; and
FIGURE 14 is a broken perspective of the male member.

Consider first the male section depicted in FIGURES 1–5. A section of tubing or casing is indicated generally by the numeral 20, and includes a female casing thread 21, at one end thereof, to permit linkage to another member as desired. An intermediate cylindrical portion 22 extends downwardly of said casing thread, extending approximately midway of the length of said male member. Adjacent the terminal end of said thickened portion, opposite casing thread 21, the body of male section 20 is reduced in thickness, forming annular shoulder 23. Said shoulder possesses a plurality of sockets or recesses 24 adapted to receive lug or stop means as hereinafter described. Said sockets communicate with fastener receiving means 26, such as drilled holes which may have countersunk portions and may be threaded to receive screws or bolts 27. Lugs or stops 28 are partially insertable within sockets 24, and may be affixed thereto by said bolts or other fasteners 28 passing through a threaded aperture (not shown in said lugs). The lower portion of said lugs would extend downwardly of shoulder 23, and terminate short of tooth profiled portion 29 of the tubing. The teeth in said portion are buttress type with no lead angle and, as shown especially in FIGURE 1 comprise oppositely disposed vertical groupings 31 and 32. A larger number of oppositely disposed groupings of teeth could be utilized, but for ease of presentation, only two such groupings are presented. Also, as shown in FIGURE 14, the upper surfaces of the opposite ends of the teeth may be beveled for mating, as hereinafter described. Below said tooth profiled portion, and below enlarged tooth-like member 29a, the exterior surface of tubing 20 is annularly slotted at 33 to receive sealing means such as an "O" ring.

Below said sealing means slot, the male portions contribution to a locking taper is provided (see FIGURE 2 in conjunction with the detail of FIGURE 5). The exterior surface of member 20 below sealing means 33 is substantially parallel to its axis, as at 34, for a short distance, and thereafter tapers radially inwardly, as at 35, said tapering portion forming a small abrupt shoulder at 36, below which said exterior surface of member 20 resumes its generally, axially parallel course, interrupted only by slot 37 for receiving other sealing means such as a further O-ring. The male portion terminates at 39.

Move now to FIGURES 6, 7, 8, 9 and 10, which depict the female member of this back-off joint. Said female member is generally cylindrical and is illustrated generally by the numeral 50. The upper surface 51 of member 50 possesses spaced upwardly directed extensions or lugs 52, for coacting with depending lugs or stop means 28 on male member 20. Just below said upper surface 51, the interior surface of female member 50, is toothed profiled as at 53, said teeth being of the buttress type for coacting with similar mating teeth on male member 20, said female teeth occurring in oppositely disposed vertical groupings 54 and 55 (see FIGURE 7). Here, said teeth may be beveled on their lower surface at their extreme ends, as indicated in FIGURE 6, for coacting with the male teeth. Below the lowermost of said interior teeth 53 and below enlarged groove 53a, the interior surface of member 50 is substantially parallel to its axis, as indicated at 61, this being the area of association with sealing slot 33 of male member 20. Below said surface 61, an abrupt shoulder 62 is formed, below said shoulder the inner surface of member 50 tapers slightly radially inwardly, as at 63, for a distance wherein, as at 64, it resumes its course parallel to the axis of member 50. A surface or shoulder 65 may be provided with clearance for bottom 39 of male member 20. The detail of FIGURES 9 and 10 represent that portion of FIGURE 8 shown in phantom lines and designated by numerals 9 and 10, respectively.

When operative, male member 20 may be lowered, as by a casing 90, shown illustratively in FIGURE 11. The nose, or portion of male member 20 intermediate its bottom 39 and its toothed portion 29 should be long enough so as to enter and guide the male device within female member 50 and to prevent the O-rings 33a and 37a within recesses 33 and 37 from being damaged by binding upon teeth 53 of member 50. Inasmuch as both male and female members possess a like number of spaced groupings of buttress teeth, on insertion of member 20 within member 50, male teeth 29 would tend to pass between female teeth 53. On the male member bottoming out within the female member, rotation of the male member will cause the teeth to be operatively mated, as in FIGURE 11 with tooth-like member 29a being received within groove 53a. Prior to rotation, the respective portions of the locking taper may be in contact, on initial rotation, the beveled portions of the respective male and female teeth would contact. Further rotation would result in the male member being forced downwardly within the female member, by virtue of the beveling, thereby tightening the seal of the locking taper illustrated in FIGURE 13. Rotation would be limited by virtue of male lug 28 pressing against fixed female lug 52. It should be noted that by virtue of the plurality of lug positioning means, sockets 24, lugs 28 on male member 20 may be so located as to permit either right or left handed rotation of said male member to engage or disengage said female member. By virtue of the locking taper, illustrated best in FIGURE 13, a metal to metal contact or seal occurs between respective portions of surface 35 of the male member and surface 63 of the female member, assuring a metal-to-metal pressure seal between the two members, O-ring secondary sealing means being provided both above and below said locking taper. The thin walled section of the male member adjacent portion 36 provides flexibility of the seal while engaging, and also allows pressure acting on the inside of the connection to further tighten the metal-to-metal seal by virtue of this thin wall trying to deflect outward.

Thus, it is seen that a unique and novel joint has been provided which is securable by rotation in either chosen direction, requiring as small an amount of rotation as desired.

Although a single embodiment has been depicted, it should be obvious that numerous modifications are possible by one skilled in the art without departing from the invention.

I claim:
1. In a joint, the combination of:
   a first tubular member;
   a second tubular member;
   said first member having a portion thereof insertable within said second member; and
   means for releasably connecting said members together on said first member being rotated in either direction, said means comprising a plurality of circumferentially spaced groupings of teeth on both of said members and said stop means on one of said members engageable with means on the other member to limit said rotation to less than one revolution but permitting disengagement of said members without first moving said stop means on rotating said first member in the opposite direction.

2. The joint of claim 1 wherein said first member is provided with a cylindrical sleeve guide portion below said teeth insertable into said second member before engagement of said connecting means for aligning said members, said first member having a tapered surface between said guide portion and said teeth cooperating with a tapered surface adjacent the teeth of said second member on engagement to form a pressure seal between said members.

3. The joint of claim 2 wherein the wall thickness of said first member at said tapered surface is less than the wall thickness thereabove or therebelow to provide flexibility for said pressure seal.

4. The joint of claim 2 wherein other sealing means are provided one of said members adjacent said tapered surfaces.

5. The joint of claim 1 wherein said plurality of spaced groupings of teeth have no lead angle, said groupings of said first member adapted to pass intermediate said groupings of said second member during insertion of said first member into said second member.

6. The joint of claim 5 wherein on said insertion of said first member into said second member the teeth profiles of said members are in slight axial disalignment requiring an axial force to permit operative engagement of said teeth, the teeth of one of said member groupings being beveled at each end to allow initial rotation of said first member.

7. In a joint, the combination of:
   a first tubular member and
   a second tubular member,
   said first member having a portion thereof insertable within said second member,
   tooth means provided each of said members for releasably connecting said members together on said first member being rotated,
   cooperating tapered surfaces on each member adjacent said tooth means forming a pressure seal between said members on said rotation,
   said first member having a cylindrical guide portion adjacent said tapered surface,
   the wall thickness of said first member at said tapered surfaces being less than its wall thickness thereabove and therebelow to provide flexibility for said pressure seal.

8. The joint of claim 7 wherein said cylindrical guide portion is insertable into said second member before engagement of said tooth means for aligning said members.

9. The joint of claim 8 wherein other sealing means are provided one of said members adjacent said tapered surfaces.

10. The joint of claim 9 wherein said tapered surfaces lie between said guide portion and said tooth means and wherein said other sealing means comprises an annular resilient seal member.

11. In a joint, the combination of:
a first tubular member;
a second tubular member;
said first member having a portion thereof insertable within said second member;
tooth means provided each of said members for releasably connecting said members together on said first member being rotated in either direction,
said tooth means comprising a plurality of spaced groupings of teeth having no lead angle, said groupings of said first member adapted to pass intermediate said groupings of said sceond member during insertion of said first member portion into said second member,
the tooth profiles of said first member groupings and said second member groupings being slightly out of axial alignment on said insertion requiring an axial force to permit full engagement of said teeth, the teeth of one of said members being beveled at each end to allow initial rotation of said first member.

12. The joint of claim 11 wherein said first member comprises a cylindrical guide portion below said tooth means insertable into said second member before engagement of said tooth means for aligning said members and wherein cooperating tapered surfaces are provided each member adjacent said tooth means forming a metal-to-metal pressure seal between said members on application of said axial force.

13. The joint of claim 12 wherein the wall thickness of said first member above and below said tapered surfaces is less than the wall thickness at said tapered surface providing flexibility for said pressure seal.

14. The joint of claim 13 wherein resilient annular seal means are provided said members above and below said tapered surfaces.

References Cited

UNITED STATES PATENTS

| | | | |
|---|---|---|---|
| 906,217 | 12/1908 | Gaylord | 285—376 X |
| 2,645,438 | 7/1932 | Kalikow | 285—401 X |
| 2,773,707 | 12/1950 | Fraser | 285—401 X |

FOREIGN PATENTS 642,982　6/1962　Canada.

THOMAS F. CALLAGHAN, *Primary Examiner.*

U.S. Cl. X.R.

85—7; 285—332.2, 332.4, 351, 376